Jan. 12, 1960     P. SCHAURTE     2,920,577
APPARATUS FOR CONVEYING GASES OR LIQUIDS
Filed Jan. 10, 1956
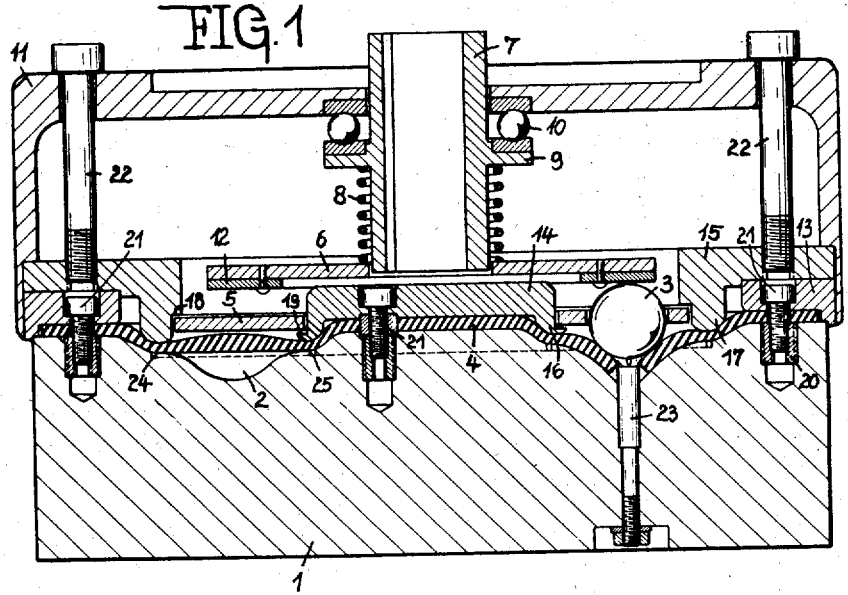
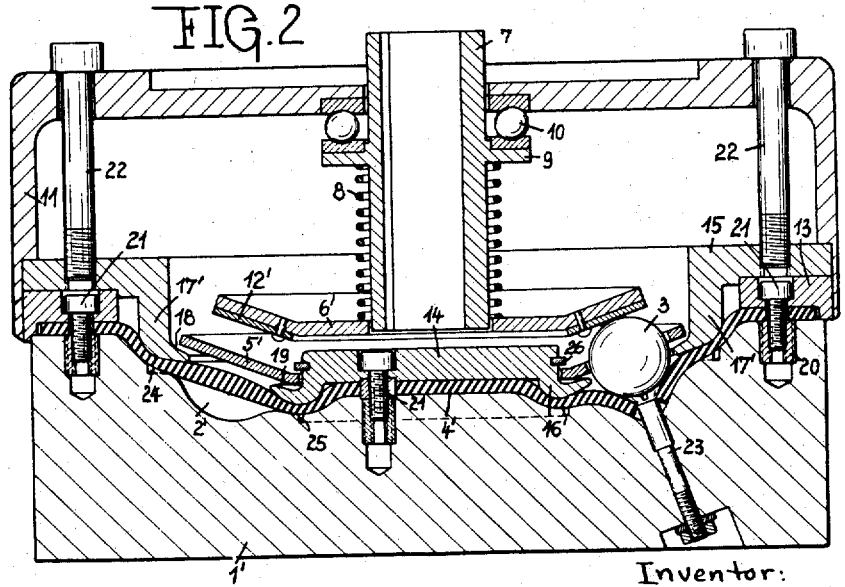
Inventor:
Paul Schaurte
By: Michael S. Striker
agt.

United States Patent Office 2,920,577
Patented Jan. 12, 1960

2,920,577

APPARATUS FOR CONVEYING GASES OR LIQUIDS

Paul Schaurte, Schaan-Sax, Liechtenstein

Application January 10, 1956, Serial No. 558,352

14 Claims. (Cl. 103—149)

The present invention relates to improvements in apparatus for conveying gases or liquids, and more particularly in apparatus of the type disclosed in my copending application, Serial No. 468,946, now matured into Patent No. 2,841,091.

The apparatus of this type known prior to this invention, generally called rotary or positive-displacement pumps, usually comprise some resilient, deformable member which is closing an operating chamber, and rolling bodies which are revolving about a central axis extending vertically to the resilient member and which are adapted to act upon such member so as to deform the same and partition the operating chamber progressively at the respective point of compression. Thus, the cross-sectional area of the operating chamber varies continuously during the operation, and the chamber space behind the rolling body or bodies, that is, on the suction side of the pump, will be continuously enlarged when the resilient member is released by the rolling body or bodies and springs back to its original position, while ahead of the latter, that is, on the compression side of the pump, the chamber space will be continuously reduced.

In my copending application, Serial No. 468,946, filed on November 15, 1954, it has been proposed to provide the resilient, deformable member in the form of a diaphragm which is of equal thickness at all points. As long as the rolling bodies do not depress this diaphragm into the annular groove which forms the operating chamber in the pump housing, the outer surfaces of this diaphragm extend substantially vertical relative to the rotary axis of the shaft which is operatively associated with the rolling bodies to roll the same along their circular path. The diaphragm is secured at least at one point relative to the housing so that the continuity of the operating chamber will be interrupted at such point. Although this apparatus has proved to be very successful in actual practice, it has been found that valuable improvements may be made therein to render its operation more effective and safer.

It is the object of the present invention to improve a pump of this type by increasing the thickness of the resilient, deformable diaphragm or similar means within the area of the action of the rolling bodies and to make those portions of the diaphragm which are directly or indirectly affected by these bodies thicker than the other parts thereof.

Thus, for example, it is a feature of the invention to increase the thickness of the diaphragm at such contact area of the rolling bodies so as to have an arcuate shape in cross section. The curved portion of the diaphragm should then face toward the rolling body, while the other side which covers the annular operating chamber may be substantially flat.

Another object of the present invention is to provide the resilient, deformable means with an initial tension within the area which is affected by the rolling bodies, and, in the case of a diaphragm, preferably in a radial direction thereof.

In order further to increase the tension of the affected area of the diaphragm or the like it is another object of the invention to mount such area so as to be disposed within a plane different from those of the other parts of the diaphragm. Thus, for example, the affected surface may be disposed within a plane which is parallel to the plane or planes of the other parts of the diaphragm, or it may be disposed within one or more planes which extend at an angle to the plane or planes of the other parts.

The advantages obtained by a diaphragm of such design and construction over a diaphragm of equal thickness throughout which is mounted within the same plane are very considerable. They principally consist in the fact that the friction will be reduced between the rolling bodies and the resilient diaphragm or similar deformable means, and that the diaphragm or the like will be capable of returning very quickly to its normal position after having once been depressed into the annular operating chamber.

While in the apparatus as described in my earlier application as mentioned above the means for securing the diaphragm relative to the housing consists of one or more flat rings or disks, it is another object of the present invention to provide these mounting means with flanges or the like which extend within an annular plane which is directed vertically to the plane of the ring or disk. A supplementary feature of the invention consists in removing the sharp edges of the end surfaces of such flanges, and in preferably rounding off these end surfaces, so that, when placed in engagement with the diaphragm so as to tension the area affected by the rolling bodies, they will not exert any cutting action upon the diaphragm.

Still another object of the invention is to provide the mentioned flanges on the mounting rings or disks with a plurality of guiding surfaces for the cage which, in turn, guides the rolling bodies, and also to design these flanges in a shape which will prevent the diaphragm from excessively deforming or buckling if the pressure in the operating chamber should become excessive.

Further objects, features, and advantages of the present invention will become apparent from the following detailed description thereof, as well as from the accompanying drawings, in which—

Fig. 1 shows a cross section through an apparatus according to the present invention, the resilient, deformable means of which consists of a diaphragm which is molded and mounted so that its clamped surfaces and those surfaces which are acted upon by the rolling body or bodies will be disposed within two different planes which are parallel to each other; while Fig. 2 shows a cross section through a modification of the invention, the diaphragm of which is molded and mounted so that its clamped surfaces and the surfaces which are acted upon by the rolling bodies are disposed at an angle relative to each other.

Referring to the drawings, in which all those parts which perform the same function are identified by the same reference numerals, a housing 1 contains an operating chamber in the form of an annular troughlike groove 2, the generatrix of which substantially forms a central circular arc which merges into two curved portions so that the common tangent which is determined by the points of connection with the circular arc appears as a tangent through the point of inflection.

At those points where the rolling bodies which preferably are in the form of spherical balls 3 are located at that particular time, they will depress the diaphragm 4 into groove 2 and fill out the same completely. Balls 3, of which preferably three are provided at even distances from each other, are all guided within a single plate 5 which by the provision of suitable apertures forms a cage for each of balls 3. An annular disk 6 which is positively connected to a drive shaft 7, for example, by drivers, lugs, dogs, or the like which engage in suitable slots in disk 6, engages balls 3 so as to depress the same upon diaphragm 4 so that the latter will close groove 2. Thus, balls 3 will revolve along their own axis at one-half of the angular velocity of shaft 7. In order to exert the necessary pressure upon balls 3, one or more resilient means such as a coil spring 8, may be provided. This spring 8 may loosely surround shaft 7 and one end may act upon disk 6, while the other end rests against a flange 9 on shaft 7 which at the same time may serve as a support for thrust bearings 10, the other side of which rests against a cover 11 and is mounted therein. On the side facing balls 3, disk 6 is provided with a friction lining 12 of a material similar to that of diaphragm 4 so as to prevent disk 6 from slipping relative to balls 3.

Diaphragm 4 is securely mounted on housing 1 by means of an outer ring 13, a second ring 15, and a central disk 14. Ring 13 secures the peripheral portions of diaphragm 4 to housing 1, while the downward flanges 16 and 17 on disk 14 and ring 15, respectively, depress diaphragm 4 out of the plane in which it is held by ring 13. As clearly seen in the drawings, all surfaces and edge portions of flanges 16 and 17, as well as of all other parts which are in engagement with diaphragm are curved or rounded off so as to prevent the latter from being cut. The pressure of flanges 16 and 17 deforms diaphragm 4 within the area in which it is acted upon by balls 3, and thereby places such area under tension. Consequently, as soon as balls 3 in their progressive movement along their circular path no longer act upon a certain point of diaphragm 4, that point will immediately snap back to its normal position. Diaphragm 4 is made of uneven thickness insofar as within the annular groove-covering area thereof, it will be of gradually increasing thickness forming a bulge which is thickest at the circular line of engagement with balls 3. Flanges 16 and 17 on disk 14 and ring 15, respectively, may also be provided with rimlike projections 18 and 19 for guiding the annular cage plate 5.

The two rings 13 and 15 and the central disk 14 are secured by means of bolts 21 to housing 1 which is preferably made of aluminum or a similar light metal. Of these bolts, only those are shown in the drawings which secure ring 13 and disk 14 and engage in sockets 20 which preferably are of the self-tapping kind, while the bolts which secure ring 15 are not shown since they are angularly displaced relative to bolts 21 and screwed to housing 1 near the periphery thereof. Cover 11 is secured to housing 1 by bolts 22 which are screwed into disk 15 in line with bolts 21. Housing 1 is further provided with a bolt 23 which draws diaphragm 4 tightly into groove 2 and thereby interrupts the continuity of the operating chamber at this particular point. Thus, balls 3 do not need to exert any compressive action upon diaphragm 4 at this point in order to close off the groove. The inlet and outlet (not shown) leading to groove 2 lie at opposite sides of bolt 23, that is, forwardly and rearwardly thereof, as seen in the drawings, depending upon the direction of rotation of balls 3. The air, gases, or liquids to be pumped therefore pass through such inlet into the annular groove 2 where they are continuously conveyed along by the revolving balls toward and through the outlet. Annular grooves 24 and 25 may be provided to serve in cooperation with diaphragm 4 as a gas seal.

In the embodiment of the invention as shown in Fig. 1, the resilient diaphragm 4 is being deformed by clamping its central and peripheral surfaces within one plane, while those which will be acted upon by balls 3 lie within another plane which is parallel to the first plane. Ring 13 and disk 14 therefore lie within the same plane. In the embodiment as shown in Fig. 2, however, the respective upper surfaces of housing 1' and the clamping elements are shaped so that the peripheral portion of diaphragm 4' lies in one plane and the central portion thereof is clamped within another plane parallel to the first plane, while the diaphragm surface which will be acted upon by balls 3 extends at an angle to both planes and to the clamped portions of the diaphragm so that the latter has a substantially frusto-conical shape. Cage ring 5', disk 6', and friction ring 12' are shaped accordingly so that their surfaces are likewise of substantially frusto-conical shape. Flanges 16' and 17' are also shaped so as to comply with such shape of diaphragm 4', and they are extended in a direction toward the circular path of balls 3. Flanges 16' and 17' therefore not only exert a pressure upon diaphragm 4' in order to tighten the annular portion thereof which will be acted upon by balls 3, but they also act as retaining means to prevent diaphragm 4' from bulging upwardly excessively if the pressure in the operating chamber 2' should exceed a certain limit. The upper surfaces 18 and 19 of these projecting flanges 16' and 17' may also serve as lower guiding means for cage ring 5', while a spring ring 26 or the like will guide cage ring 5' in the upward direction.

Depending upon the particular use of the pump, the operating chamber 2 or 2' may also be discontinued at a plurality of points by providing several bolts 23 to draw the diaphragm tightly into the bottom of the annular groove. Of course, in such event, a corresponding number of inlets and outlets should then be provided on either side of bolts 23.

Although my invention has been illustrated and described with reference to the preferred embodiments thereof, I wish to have it understood that it is in no way limited to the details of such embodiments but is capable of numerous modifications within the scope of the appended claims. Thus, for example, the features of both embodiments illustrated may be combined with each other, and the resilient element which is to be deformed according to the invention for the purpose of conveying or pumping gases or liquids does not necessarily have to consist of a diaphragm which is depressed into an annular groove, but may also be of a different type, such as, for example, a hose or elastic strip or tape or the like.

Having thus fully disclosed my invention, what I claim as new is:

1. In an apparatus for conveying a gaseous or liquid medium comprising a housing, a central shaft rotatable within said housing, said housing having therein a lower portion with an upper surface extending at a right angle to said shaft, at least one annular groove within said surface coaxially with said shaft, resilient deformable means clamped upon said surface and overlying said groove, said groove and deformable means together forming an annular channel, at least one rotatable element, and resilient means secured to said shaft and in frictional engagement with said rotatable element for rotating the same along said groove and for pressing said element upon the upper surface of said deformable means, thereby depressing said deformable means into said groove, the annular portion of said deformable means overlying said groove when in its normal position and not acted upon by said rotatable element being of substantially convex cross-sectional shape at the side facing said rotatable element and being substantially flat at the other side facing said groove.

2. An apparatus for conveying a gaseous or liquid medium comprising a housing, a central shaft rotatable within said housing, said housing having therein a lower portion with an upper surface extending at a right angle to said shaft, at least one annular groove within said surface coaxial with said shaft, resilient deformable means clamped upon said surface and overlying said groove, said groove and deformable means together forming an annular channel, at least one inlet and one outlet for said medium substantially adjacent each other in said housing and communicating with said channel, at least one partition within said groove intermediate said inlet and outlet and connected to said deformable means, at least one rotatable element, cage means engaging the latter for guiding the same along a circular path coinciding with a vertical cylindrical plane passing through the center of said annular groove, as seen in a cross section thereof, resilient means secured to said shaft and in frictional engagement with said rotatable element so as to rotate the same and press said element upon the upper surface of said deformable means, thereby depressing said deformable means at such particular point into said groove so as to fill the same at such point completely, the annular portion of said deformable means overlying said groove when in its normal position and not acted upon by said rotatable element being of substantially convex cross-sectional shape at the side facing said rotatable element and being thickest substantially within said vertical cylindrical plane, and being substantially flat at the other side facing said groove, so that when said rotatable element rolls in one direction along said circular path on said convex portion and simultaneously depresses said portion into said groove, it progressively moves said medium along said channel from the inlet to the outlet thereof, and means securing said annular portion to said housing so as to be at all times under tension, so that, when said rotatable element no longer positively depresses one particular point of said annular portion into said groove, said point will quickly return to said normal convex position.

3. An apparatus for conveying a gaseous or liquid medium comprising a housing, a central shaft rotatable within said housing, said housing having therein a lower portion with an upper surface extending at a right angle to said shaft, at least one annular groove within said surface coaxial with said shaft, resilient deformable means arranged upon said surface in such a manner that an annular portion of said deformable means overlies said groove, said groove and deformable means together forming an annular channel, at least one inlet and one outlet for said medium substantially adjacent each other in said housing and communicating with said channel, at least one partition within said groove intermediate said inlet and outlet and connected to said deformable means, at least one rotatable element, cage means engaging the latter for guiding the same along a circular path coinciding with a vertical cylindrical plane passing through the center of said annular groove, as seen in a cross section thereof, resilient means secured to said shaft and in frictional engagement with said rotatable element so as to rotate the same and press said element upon the upper surface of said deformable means, thereby depressing said deformable means at such particular point into said groove so as to fill the same at such point completely, said annular portion of said deformable means overlying said groove when in its normal position and not acted upon by said rotatable element being of substantially convex cross-sectional shape at the side facing said rotatable element and being thickest substantially within said vertical cylindrical plane, and being substantially flat at the other side facing said groove, so that when said rotatable element rolls in one direction along said circular path on said convex portion and simultaneously depresses said portion into said groove, it progressively moves said medium along said channel from the inlet to the outlet thereof, and clamping means securing said annular portion to said housing so as to be at all times under tension and including mounting surfaces engaging said deformable means at portions respectively located adjacent and on opposite sides of said annular portion thereof for positioning said adjacent portions in at least one plane and for displacing said annular portion in stretched condition relative to said plane so that, when said rotatable element no longer positively depresses one particular point of said annular portion into said groove, said point will quickly return to said normal convex position.

4. An apparatus for conveying a gaseous or liquid medium comprising a housing, a central shaft rotatable within said housing, said housing having therein a lower portion with an upper surface extending at a right angle to said shaft, at least one annular groove within said surface coaxial with said shaft, resilient deformable means arranged upon said surface in such a manner that an annular portion of said deformable means overlies said groove, said groove and deformable means together forming an annular channel, at least one inlet and one outlet for said medium substantially adjacent each other in said housing and communicating with said channel, at least one partition within said groove intermediate said inlet and outlet and connected to said deformable means, at least one rotatable element, cage means engaging the latter for guiding the same along a circular path coinciding with a vertical cylindrical plane passing through the center of said annular groove, as seen in a cross section thereof, resilient means secured to said shaft and in frictional engagement with said rotatable element so as to rotate the same and press said element upon the upper surface of said deformable means, thereby depressing said deformable means at such particular point into said groove so as to fill the same at such point completely, said annular portion of said deformable means overlying said groove when in its normal position and not acted upon by said rotatable element being of substantially convex cross-sectional shape at the side facing said rotatable element and being thickest substantially within said vertical cylindrical plane, and being substantially flat at the other side facing said groove, so that when said rotatable element rolls in one direction along said circular path on said convex portion and simultaneously depresses said portion into said groove, it progressively moves said medium along said channel from the inlet to the outlet thereof, and clamping means securing said annular portion to said housing so as to be at all times under tension and including mounting surfaces engaging said deformable means at portions respectively located adjacent and on opposite sides of said annular portion thereof for positioning said adjacent portions substantially in one plane and said annular portion in a plane spaced from and substantially parallel to said one plane so that, when said rotatable element no longer positively depresses one particular point of said annular portion into said groove, said point will quickly return to said normal convex position.

5. An apparatus for conveying a gaseous or liquid medium comprising a housing, a central shaft rotatable within said housing, said housing having therein a lower portion with an upper surface extending at a right angle to said shaft, at least one annular groove within said surface coaxial with said shaft, resilient deformable means arranged upon said surface in such a manner that an annular portion of said deformable means overlies said groove, said groove and deformable means together forming an annular channel, at least one inlet and one outlet for said medium substantially adjacent each other in said housing and communicating with said channel, at least one partition within said groove intermediate said inlet and outlet and connected to said deformable means, at least one rotatable element, cage means engaging the latter for guiding the same along a circular path coinciding with a vertical cylindrical plane passing through the center of said annular groove, as seen in a cross section thereof, resilient means secured to said shaft and in frictional engagement with said rotatable element so as to rotate the same and press said element upon the upper surface of said deformable means, thereby depressing said deformable means at such particular point into said groove so as to fill the same at such point completely, said annular portion of said deformable means overlying said groove when in its normal position and not acted upon by said rotatable element being of substantially convex cross-sectional shape at the side facing said rotatable element and being thickest substantially within said vertical cylindrical plane, and being substantially flat at the other side facing said groove, so that when said rotatable element rolls in one direction along said circular path on said convex portion and simultaneously depresses said portion into said groove, it progressively moves said medium along said channel from the inlet to the outlet thereof, and clamping means securing said annular portion to said housing so as to be at all times under tension and including mounting surfaces engaging said deformable means at portions respectively located adjacent and on opposite sides of said annular portion thereof for positioning said adjacent portions respectively in two planes substantially parallel to and spaced from each other and for placing said annular portion in stretched condition inclined to said planes so that, when said rotatable element no longer positively depresses one particular point of said annular portion into said groove, said point will quickly return to said normal convex position.

6. An apparatus for conveying a gaseous or liquid medium comprising a housing, a central shaft rotatable within said housing, said housing having therein a lower portion with an upper surface extending at a right angle to said shaft, at least one annular groove within said surface coaxial with said shaft, resilient deformable means clamped upon said surface in such a manner that an annular portion of said deformable means overlies said groove, said groove and deformable means together forming an annular channel, at least one inlet and one outlet for said medium substantially adjacent each other in said housing and communicating with said channel, at least one partition within said groove intermediate said inlet and outlet and connected to said deformable means, at least one rotatable element, cage means engaging the latter for guiding the same along a circular path coinciding with a vertical cylindrical plane passing through the center of said annular groove, as seen in a cross section thereof, and resilient means secured to said shaft and in frictional engagement with said rotatable element so as to rotate the same and press said element upon the upper surface of said deformable means, thereby depressing said deformable means at such particular point into said groove so as to fill the same at such point completely, the annular portion of said deformable means overlying said groove when in its normal position and not acted upon by said rotatable element being of substantially convex cross-sectional shape at the side facing said rotatable element and being thickest substantially within said vertical cylindrical plane, and being substantially flat at the other side facing said groove, so that when said rotatable element rolls in one direction along said circular path on said convex portion and simultaneously depresses said portion into said groove, it progressively moves said medium along said channel from the inlet to the outlet thereof, and means securing said annular portion to said housing so as to be at all times under tension, and comprising a central clamping member and at least one annular outer clamping member, each of said clamping members being formed with a transverse flange engaging said deformable means at portions thereof adjacent to said annular portion.

7. An apparatus for conveying a gaseous or liquid medium comprising a housing, a central shaft rotatable within said housing, said housing having therein a lower portion with an upper surface extending at a right angle to said shaft, at least one annular groove within said surface coaxial with said shaft, resilient deformable means arranged upon said surface in such a manner that an annular portion of said deformable means overlies said groove, said groove and deformable means together forming an annular channel, at least one inlet and one outlet for said medium substantially adjacent each other in said housing and communicating with said channel, at least one partition within said groove intermediate said inlet and outlet and connected to said deformable means, at least one rotatable element, cage means engaging the latter for guiding the same along a circular path coinciding with a vertical cylindrical plane passing through the center of said annular groove, as seen in a cross section thereof, resilient means secured to said shaft and in frictional engagement with said rotatable element so as to rotate the same and press said element upon the upper surface of said deformable means, thereby depressing said deformable means at such particular point into said groove so as to fill the same at such point completely, said annular portion of said deformable means overlying said groove when in its normal position and not acted upon by said rotatable element being of substantially convex cross-sectional shape at the side facing said rotatable element and being thickest substantially within said vertical cylindrical plane, and being substantially flat at the other side facing said groove, so that when said rotatable element rolls in one direction along said circular path on said convex portion and simultaneously depresses said portion into said groove, it progressively moves said medium along said channel from the inlet to the outlet thereof, and clamping means securing said annular portion to said housing so as to be at all times under tension, and comprising a central member and at least one annular outer member for clamping said deformable means relative to said upper surface of said lower housing portion, said central and outer members engaging said deformable means at central and outer annular portions thereof, respectively, said upper surface having surface portions for positioning said central and outer portions of said deformable means in at least one plane and for displacing said annular portion in stretched condition relative to this plane, said clamping members having transverse flanges projecting substantially to the plane of the upper surface of said annular portion, said flanges having rounded end surfaces for clamping said annular portion at both sides thereof in a tensioned condition.

8. An apparatus for conveying a gaseous or liquid medium comprising a housing, a central shaft rotatable within said housing, said housing having therein a lower portion with an upper surface extending at a right angle to said shaft, at least one annular groove within said surface coaxial with said shaft, resilient deformable means clamped upon said surface in such a manner that an annular portion of said deformable means overlies said groove, said groove and deformable means together forming an annular channel, at least one inlet and one outlet for said medium substantially adjacent each other in said housing and communicating with said channel, at least one partition within said groove intermediate said inlet and outlet and connected to said deformable means, at least one rotatable element, cage means engaging the latter for guiding the same along a circular path coinciding with a vertical cylindrical plane passing through the center of said annular groove, as seen in a cross section thereof, resilient means secured to said shaft and in frictional engagement with said rotatable element so as to rotate the same and press said element upon the upper surface of said deformable means, thereby depressing said deformable means at such particular point into said groove so as to fill the same at such point completely, an annular portion of said deformable means overlying said groove when in its normal position and not acted upon by said rotatable element being of substantially convex cross-sectional shape at the side facing said rotatable element and being thickest substantially within said vertical cylindrical plane, and being substantially flat at the other side facing said groove, so that when said rotatable element rolls in one direction along said circular path on said convex portion and simultaneously depresses said portion into said groove, it progressively moves said medium along said channel from the inlet to the outlet thereof, and clamping means securing said annular portion to said housing so as to be at all times under tension, and comprising a central member and at least one annular outer member for clamping said deformable means at portions respectively located adjacent and on opposite sides of said annular portion thereof to said upper surface of said lower housing portion so as to locate said adjacent portions in at least one plane and said upper surface of said lower housing portion having surface portions displacing said annular portion in stretched condition relative to said plane in which said adjacent portions are located, said clamping members having transverse flanges projecting substantially to the plane of the upper surface of said annular portion, said flanges having rounded end surfaces for clamping said annular portion at both sides thereof in a tensioned condition, and means on said clamping members for guiding said guiding means of said rotatable element.

9. An apparatus for conveying a gaseous or liquid medium comprising a housing, a central shaft rotatable within said housing, said housing having therein a lower portion with an upper surface extending at a right angle to said shaft, at least one annular groove within said surface coaxial with said shaft, resilient deformable means arranged upon said surface in such a manner that an annular portion of said deformable means overlies said groove, said groove and deformable means together forming an annular channel, at least one inlet and one outlet for said medium substantially adjacent each other in said housing and communicating with said channel, at least one partition within said groove intermediate said inlet and outlet and connected to said deformable means, at least one rotatable element, cage means engaging the latter for guiding the same along a circular path coinciding with a vertical cylindrical plane passing through the center of said annular groove, as seen in a cross section thereof, resilient means secured to said shaft and in frictional engagement with said rotatable element so as to rotate the same and press said element upon the upper surface of said deformable means, thereby depressing said deformable means at such particular point into said groove so as to fill the same at such point completely, an annular portion of said deformable means overlying said groove when in its normal position and not acted upon by said rotatable element being of substantially convex cross-sectional shape at the side facing said rotatable element and being thickest substantially within said vertical cylindrical plane, and being substantially flat at the other side facing said groove, so that when said rotatable element rolls in one direction along said circular path on said convex portion and simultaneously depresses said portion into said groove, it progressively moves said medium along said channel from the inlet to the outlet thereof, and clamping means securing said annular portion to said housing so as to be at all times under tension, and comprising a central member and at least one annular outer member for clamping said deformable means at portions respectively located adjacent and on opposite sides of said annular portion thereof to said upper surface of said lower housing portion so as to locate said adjacent portions in at least one plane and said upper surface of said lower housing portion having surface portions displacing said annular portion in stretched condition relative to said plane in which said adjacent portions are located, said clamping members having transverse flanges projecting substantially to the plane of the upper surface of said annular portion, said flanges having rounded end surfaces for clamping said annular portion at both sides thereof in a tensioned condition, and annular projections on said flanges extending substantially parallel to said tensioned annular portion and in a direction toward the path of movement of said rotatable element for guiding said guiding means of said rotatable element.

10. An apparatus for conveying a gaseous or liquid medium comprising a housing, a central shaft rotatable within said housing, said housing having therein a lower portion with an upper surface extending at a right angle to said shaft, at least one annular groove within said surface coaxial with said shaft, resilient deformable means arranged upon said surface in such a manner that an annular portion of said deformable means overlies said groove, said groove and deformable means together forming an annular channel, at least one inlet and one outlet for said medium substantially adjacent each other in said housing and communicating with said channel, at least one partition within said groove intermediate said inlet and outlet and connected to said deformable means, at least one rotatable element, cage means engaging the latter for guiding the same along a circular path coinciding with a vertical cylindrical plane passing through the center of said annular groove, as seen in a cross section thereof, resilient means secured to said shaft and in frictional engagement with said rotatable element so as to rotate the same and press said element upon the upper surface of said deformable means, thereby depressing said deformable means at such particular point into said groove so as to fill the same at such point completely, an annular portion of said deformable means overlying said groove when in its normal position and not acted upon by said rotatable element being of substantially convex cross-sectional shape at the side facing said rotatable element and being thickest substantially within said vertical cylindrical plane, and being substantially flat at the other side facing said groove, so that when said rotatable element rolls in one direction along said circular path on said convex portion and simultaneously depresses said portion into said groove, it progressively moves said medium along said channel from the inlet to the outlet thereof, and clamping means securing said annular portion to said housing so as to be at all times under tension, and comprising a central member and at least one annular outer member for clamping said deformable means at portions respectively located adjacent and on opposite sides of said annular portion thereof to said upper surface of said lower housing portions so as to locate said adjacent portions in at least one plane and said upper surface of said lower housing portion having surface portions displacing said annular portion in stretched condition relative to said plane in which said adjacent portions are located, said clamping members having transverse flanges projecting substantially to the plane of the upper surface of said annular portion, said flanges having rounded end surfaces for clamping said annular portion at both sides thereof in a tensioned condition, and annular projections on said end surfaces of said flanges extending in a direction toward the path of movement of said rotatable element and substantially parallel to and closely adjacent the marginal portions of the convex side of said tensioned annular portion for protecting said annular portion from excessive pressure in said channel.

11. In a pump, in combination, a body having a surface formed with an annular groove which has inner and outer peripheral edges, said body having an annular surface portion surrounding and spaced from said groove and located in a plane toward which said groove is directed; a resilient stretchable diaphragm having a peripheral portion fixed to said annular surface portion of said body, the portion of said diaphragm which is surrounded by said peripheral portion thereof being spaced from said groove and located substantially in said plane when undeformed; and inner and outer annular pressing means engaging and stretching said diaphragm into engagement with said surface of said body along annular lines of contact with said body which are respectively located adjacent to said inner and outer peripheral edges of said groove so that said diaphragm has an annular stretched portion covering said groove and extending between said inner and outer peripheral edges thereof.

12. In a pump, in combination, a pump body having a surface provided with an outer annular portion and an inner portion surrounded by and spaced from said outer annular portion so that said surface has an intermediate annular portion surrounded by said outer annular portion and located between the latter and said inner portion, said inner surface portion and said outer annular surface portion being respectively located in different parallel planes and said intermediate annular surface portion being formed with an annular groove having inner and outer peripheral edges, at least said inner peripheral edge of said groove being located in a third plane different from and parallel to said parallel planes, the plane in which said inner surface portion is located being between said third plane and the plane in which said outer annular portion of said surface is located; a resilient stretchable diaphragm fixed to said outer annular portion of said surface so that said diaphragm covers said intermediate annular portion and inner portion of said surface and so that said groove is directed toward said diaphragm, said diaphragm when undeformed being spaced from said intermediate annular portion and inner portion of said surface; means stretching said diaphragm into engagement with and fixing the same to said inner portion of said surface; and a pair of annular pressing means further stretching said diaphragm and pressing the same against said surface respectively along a pair of annular lines of contact which are respectively located adjacent to said edges of said groove so that said diaphragm has an annular portion stretched across and extending between said edges of said groove.

13. In a pump as recited in claim 12, the outer peripheral edge of said groove being located in a plane between and parallel to said third plane and the plane in which said outer annular portion of said surface is located so that said stretched annular portion of said diaphragm has a frustoconical configuration.

14. In a pump, in combination, a pump body having a surface formed with an annular groove; a resilient stretchable diaphragm having a stretched annular portion extending across said groove and having inner and outer peripheral edges which engage said surface adjacent to inner and outer edges of said groove, respectively; an annular cage member coextensive with said stretched annular portion of said diaphragm and located closely adjacent to said annular portion of said diaphragm at the side of the latter opposite from said groove, said cage member being adapted to guide a rotary element which depresses a portion of the diaphragm into the groove; and means cooperating with said cage member to guide the same for turning movement and to maintain the same positioned closely adjacent to said annular portion of said diaphragm so that said cage member will be engaged by said diaphragm to limit the stretching of said annular portion thereof away from said groove when said annular portion of said diaphragm is acted upon by excessively large fluid pressures in said groove.

References Cited in the file of this patent

UNITED STATES PATENTS

| 34,190 | Baldwin | Jan. 21, 1862 |
| 612,834 | Dieckmann | Oct. 25, 1898 |
| 922,205 | Still | May 18, 1909 |
| 2,671,412 | Rand | Mar. 9, 1954 |

FOREIGN PATENTS

| 11,866 | France | Oct. 3, 1854 |